UNITED STATES PATENT OFFICE.

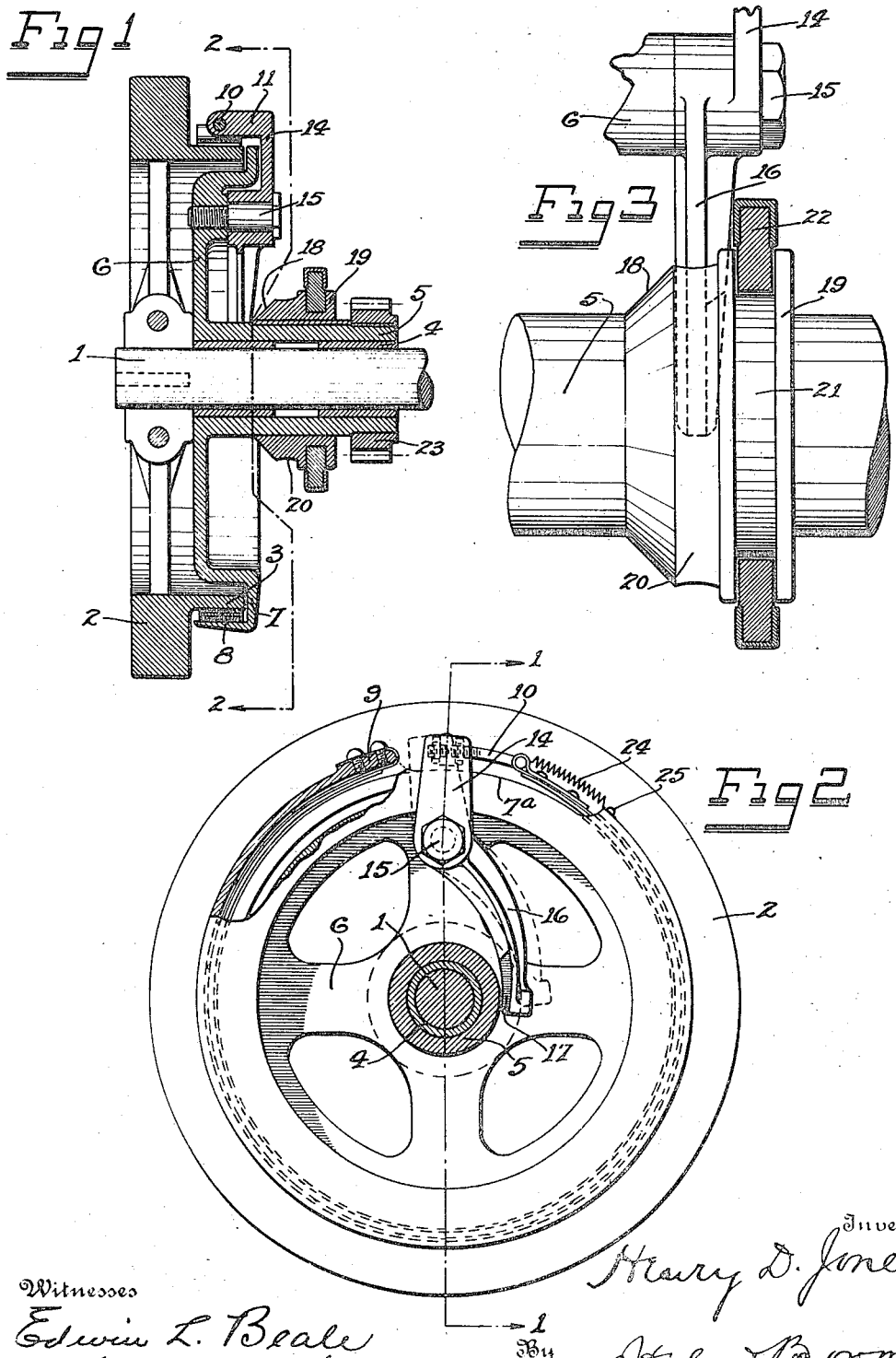

HENRY D. JONES, OF SPRINGFIELD, OHIO, ASSIGNOR TO THE KELLY-SPRINGFIELD ROAD ROLLER COMPANY, OF SPRINGFIELD, OHIO, A CORPORATION OF OHIO.

CLUTCH.

1,170,643.  Specification of Letters Patent.  Patented Feb. 8, 1916.

Application filed July 16, 1915. Serial No. 40,228.

*To all whom it may concern:*

Be it known that I, HENRY D. JONES, a citizen of the United States, residing at Springfield, in the county of Clark and State of Ohio, have invented certain new and useful Improvements in Clutches, of which the following is a specification.

This invention relates to improvements in clutches, and more particularly to clutches of the band type.

One of the objects of the invention is to provide means for holding the band in driving relation with the driving member independently of the shifting devices so that friction between the revoluble and nonrevoluble parts of the shifting devices may be obviated.

A further object of the invention is to provide means for protecting the band from wear when the parts of the clutch are out of driving relation with each other; this feature being particularly applicable to a clutch in which the driven member is revolved in the opposite direction from the driving member when out of driving relation therewith.

In the accompanying drawings:—Figure 1 is a longitudinal section of a clutch embodying my improvements, the section being on the line 1—1 of Fig. 2. Fig. 2 is a vertical section of the same, the section being on the line 2—2 of Fig. 1. Fig. 3 is a side view of the shifting devices, a portion of the same being shown in section.

The clutch to which my improvements relate is one particularly adapted for road rollers for throwing the transmission mechanism into and out of driving relation with the motive power. In practice it is usual to employ two of these clutches, one at each end of the driving shaft, for the purpose of driving the machine either in a forward or rearward direction, means being provided for throwing out one clutch as the other is thrown in. The driven clutch member of each clutch, however, is at all times connected with the transmission mechanism so when the driven member of either clutch is thrown out of driving relation with its driving member it will continue to revolve but in the opposite direction, as shown and described in an application filed by me July 16, 1915, Ser. No. 40,229.

Referring to the drawings, 1 represents the driving shaft having splined thereto the driving member of the clutch which is in the nature of a fly wheel 2 having a laterally extending depressed rim 3. Loosely mounted upon bushings 4 on the drive shaft is the extended hub 5 of the driven member 6, the extreme outer periphery of which is provided with a housing 7 which incloses the rim 3 of the driving member. Located within this housing and encircling the rim 3 is a flexible band 8, one end of which is attached to the housing as at 9 and the other end of which is attached to a link 10 which has a threaded engagement with the lateral extension 11 on the outer end of one arm 14 of a bent lever which is pivoted on the stud 15, having a screw-threaded connection with the driven member 6 below the housing; the housing being cut away as indicated at 7ª to accommodate the outer end of the arm 14 to permit of its connection with the link 10. The other curved arm 16 of the bell crank lever has a beveled face 17 which lies in proximity to the beveled face 18 of a collar 19 which is slidably mounted upon the extended hub 5 of the driven member but is splined thereto so as to revolve therewith. The collar 19 adjacent the beveled portion 18 thereof is formed with a small groove 20 and also has a groove-way 21 within which is located a ring 22 which is connected with suitable mechanism for shifting the collar back and forth upon the hub for the purpose of tightening or loosening the band due to the engagement of the inclined face 18 with the beveled portion 17 of the bell crank lever. As the collar is shifted inwardly the free end of the bell crank lever will be caused to ride up the inclined surface 18 and thus tighten the band and cause the clutch members to revolve together. As the free end of the arm 16 of the bell crank lever reaches the top of the incline 18, further shifting of the collar 20 causes the end of the arm 16 to drop into the groove 20 thus retaining the collar in its shifted position and relieving the shifting ring 22 from the work of holding the collar in that position, consequently obviating any friction between the walls of the groove 21 and the sides of the ring 22. This position of the parts is shown in Fig. 3 in which it will be seen that the free end of the arm 16 of the bell crank lever lies in the groove 20, thus holding the collar in its shifted position, while the ring 22 may be quite clear from the sides of the groove 21.

It has been heretofore stated that in the use for which this clutch is particularly adapted, when the driven member is out of driving relation with the driving member, it is being revolved in the opposite direction by reason with its connection with the transmission mechanism, through the pinion 23, as more fully described in said co-pending application. Centrifugal force, due to this rotation of the driven member, 6, causes the band 8 to have a tendency to fly outwardly at a point opposite its connection with the driven member, which would thus bring certain portions of the band in contact with the oppositely revolving rim 3, producing a wear upon the band which would soon destroy its efficiency. To obviate this, I employ the inclosing housing 7 encircling the band, which counteracts the centrifugal force of the band and has the result of holding the band against the inside of the housing 7 at all points about said housing and consequently away from the rim 3, thus obviating any friction and consequent wear between the band and the rim. I also employ a spring 24 having a connection with the link 10 and also with the housing 7, the influence of the spring being away from the connection of the link with the bell crank lever. This spring has a tendency, therefore, to hold the free end of the arm 16 of the bell crank lever against the hub 5 and thus eliminate any noise from the chattering of the lever due to the vibration of the parts. This spring also assists in holding or crowding the band against the inside of the housing, but is not essential for that purpose.

Having thus described my invention, I claim:

In a clutch, two revoluble members, each of said members having a laterally extending rim, one inclosing the other, the outer rim having an opening therein, a band connected with the outer rim adjacent said opening and lying between the respective rims, a link connected to the free end of said band, a pivoted operating lever, means for adjustably connecting said link and lever, and a spring connected to the outer rim and also to said link.

In testimony whereof, I have hereunto set my hand this 9th day of July, 1915.

HENRY D. JONES.

Witness:
CHAS. I. WELCH.